H. H. HEINTZELMAN.
COMBINED CENTERING CALIPERS AND SQUARE.
APPLICATION FILED JUNE 19, 1912.
1,066,273.
Patented July 1, 1913.
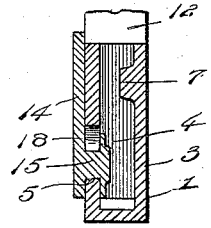
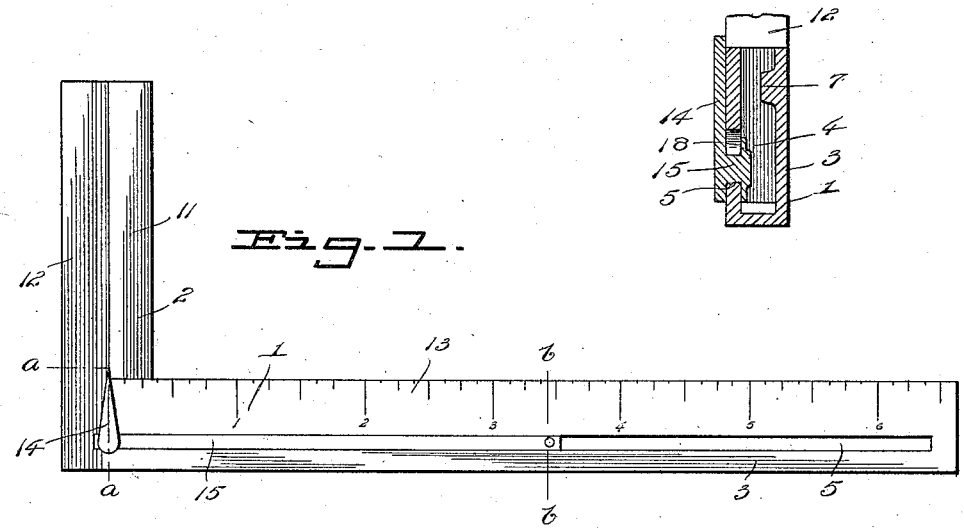
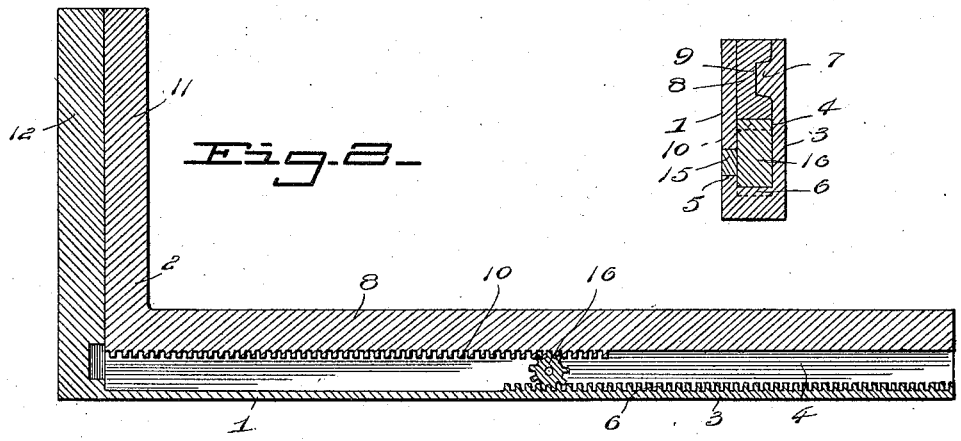
Inventor
H. H. Heintzelman.
Witnesses
By Victor J. Evans
Attorney

UNITED STATES PATENT OFFICE.

HARVEY H. HEINTZELMAN, OF MALTA, OHIO.

COMBINED CENTERING CALIPERS AND SQUARE.

1,066,273.   Specification of Letters Patent.   Patented July 1, 1913.

Application filed June 19, 1912. Serial No. 704,593.

*To all whom it may concern:*

Be it known that I, HARVEY H. HEINTZELMAN, a citizen of the United States, residing at Malta, in the county of Morgan and State of Ohio, have invented new and useful Improvements in Combined Centering Calipers and Squares, of which the following is a specification.

This invention is an improved combined centering caliper and square, the object of the invention being to provide an improved instrument of this kind which may be used both as a caliper and as a square and which also serves to indicate the center of any object measured thereby, the invention consisting in the construction, combination and arrangement of devices, hereinafter described and claimed.

In the accompanying drawing:—Figure 1 is an elevation of a combined caliper and square constructed in accordance with my invention. Fig. 2 is a longitudinal sectional view of the same. Fig. 3 is a transverse sectional view of same on the plane indicated by the line $a$—$a$ of Fig. 1. Fig. 4 is a similar view on the plane indicated by the line $b$—$b$ of Fig. 1.

In accordance with my invention, I provide a pair of squares 1—2. The square 1 has its long arm 3 provided with a longitudinal channel 4 open at one side of the said arm and one side of the said arm is provided with a longitudinal slot 5. In the bottom of the channel in the arm 3 is a rack 6 and one side or wall of the said arm is provided on its inner side with a longitudinal tongue 7. The long arm 8 of the square 2 operates in the guideway or casing formed by the channeled long arm of the square 1 and is provided in one side with a groove 9 which is engaged by the tongue 7 and is also provided on its inner edge with a rack 10 which is opposite and spaced from the rack 6 of the arm 3. Hence, the square 2 is slidably connected to the square 1 so that the short arm 11 of the square 2 may be moved toward and from the short arm 12 of the square 1 and the short arms of the squares of the instrument may hence be employed as calipers for measuring the bottom or width of the object.

The long arm 3 of the square 1 is provided on the same face which has the slot 5 with a scale 13. A pointer 14 is arranged to operate on this scale, between the arms 11 12 of the squares and this pointer is carried by a bar 15 which operates in the slot 5 and is provided on one side, at its outer end, with a pinion 16 which is arranged between and engages the racks 6—10. Owing to the fact that the pinion of the longitudinally movable bar 15 which carries the pointer, engages the racks of both of the squares, when one of the squares is moved longitudinally toward and from the other, the bar 15 with its pointer 14 moves only half as far and hence the pointer 14 is at all times midway between the arms 11—12 of the instrument so that the pointer serves to indicate the exact center of any object measured between the arms 11—12, as will be understood. The bar 15 is held in place in the slot 5 by the pointer 14 which bears on the outer side of the slotted wall of the arm 3 and a cross head 18 which bears on the inner side of said wall.

While I have herein shown and described a preferred form of my invention, I would have it understood that changes may be made in the form, proportion and construction of the several parts without departing from the spirit of my invention and within the scope of the appended claim.

I claim:—

A combined caliper and square comprising a pair of members each of which forms a square, one of said members having a hollow arm and the other having one arm slidably mounted in said hollow arm, said arms of the squares being provided with opposing spaced racks and the said hollow arm having a longitudinal tongue on the inner side of one of its side walls, the corresponding arm of the other square having a longitudinal groove engaged by said tongue, a centering member slidably mounted in the said hollow arm and having a pointer, and a pinion carried by said centering member and arranged between and engaged by the racks.

In testimony whereof I affix my signature in presence of two witnesses.

HARVEY H. HEINTZELMAN.

Witnesses:
FLORA B. SHARPE,
GEORGE W. SHARPE.

Copies of this patent may be obtained for five cents each, by addressing the "Commissioner of Patents, Washington, D. C."